United States Patent
Jana et al.

(10) Patent No.: US 11,271,659 B1
(45) Date of Patent: Mar. 8, 2022

(54) SYSTEMS AND METHODS FOR PHASE NOISE MITIGATION IN OPTICAL SUPERCHANNELS

(71) Applicants: Mrinmoy Jana, Vancouver (CA); Jeebak Mitra, Stittsville (CA); Lutz Hans-Joachim Lampe, Vancouver (CA); Jin Wang, Ottawa (CA); Zhuhong Zhang, Ottawa (CA)

(72) Inventors: Mrinmoy Jana, Vancouver (CA); Jeebak Mitra, Stittsville (CA); Lutz Hans-Joachim Lampe, Vancouver (CA); Jin Wang, Ottawa (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 17/001,299

(22) Filed: Aug. 24, 2020

(51) Int. Cl.
| | |
|---|---|
| H04B 10/61 | (2013.01) |
| H04L 5/00 | (2006.01) |
| H04L 25/03 | (2006.01) |
| H04B 10/00 | (2013.01) |
| H04B 10/079 | (2013.01) |
| H04B 10/25 | (2013.01) |

(52) U.S. Cl.
CPC ....... H04B 10/6165 (2013.01); H04L 5/0005 (2013.01); H04L 25/03006 (2013.01); *H04B 10/00* (2013.01); *H04B 10/07951* (2013.01); *H04B 10/25* (2013.01)

(58) Field of Classification Search
None
See application file for complete search history.

(56) References Cited

U.S. PATENT DOCUMENTS

| | | | | |
|---|---|---|---|---|
| 4,800,555 A | * | 1/1989 | Foschini | H04B 10/50 |
| | | | | 398/95 |
| 6,690,884 B1 | * | 2/2004 | Kelty | H04B 10/695 |
| | | | | 398/27 |
| 2002/0048062 A1 | * | 4/2002 | Sakamoto | H04B 10/2569 |
| | | | | 398/30 |

(Continued)

OTHER PUBLICATIONS

Peterson, "Suppression of adjacent-channel, cochannel, and intersymbol interference by equalizers and linear combiners", 1995, IEEE Transactions on Communications (vol. 42, Issue: 12, pp. 3109-3118) (Year: 1995).*

*Primary Examiner* — Darren E Wolf

(57) ABSTRACT

A receiver architecture is described for phase noise compensation in the presence of inter-channel interference (ICI) and inter-symbol interference (ISI), particularly for time-frequency packing (TFP) transmissions. The receiver includes a coarse phase noise (PN) estimator, a PN compensation module, an ICI cancellation module, an ISI compensation module, a FEC decoder, and an iterative PN estimator. The iterative PN estimator receives log likelihood ratio (LLR) information from the decoder and provides an iterative PN estimation to the PN compensation module. The decoder also provides LLR to the ISI compensation module, and to at least one other receiver for another subchannel that is immediately adjacent in frequency. The ICI cancellation module receives decoder output from at least one adjacent subchannel, which the ICI cancellation module uses to provide a ICI-cancelled signal.

20 Claims, 11 Drawing Sheets

(56) References Cited

U.S. PATENT DOCUMENTS

| | | | |
|---|---|---|---|
| 2003/0058497 A1* | 3/2003 | Park | H04Q 11/0005 398/82 |
| 2008/0144486 A1* | 6/2008 | Wilhelmsson | H04L 25/03159 370/208 |
| 2009/0074428 A1* | 3/2009 | Liu | H04B 10/677 398/208 |

* cited by examiner

SYSTEMS AND METHODS FOR PHASE NOISE MITIGATION IN OPTICAL SUPERCHANNELS

RELATED APPLICATIONS

This is the first patent application for the present disclosure.

FIELD

The present disclosure is related to phase noise mitigation in coherent optical communications using wavelength-division multiplexing over multiple subchannels, including systems and methods for phase noise mitigation in the presence of inter-symbol interference and inter-carrier interference.

BACKGROUND

Terabit-per-second (Tbps) data rates per carrier are being targeted for the next generation fiber optical networks to help meet ever increasing traffic demands. However, transmitting optical signals at very high baud rates per carrier can be challenging due to the bandwidth limitations of typical optoelectronics. Therefore, increasing the spectral efficiency (SE) is desirable for next generation optical transmission. As an alternative to applying higher-order modulation formats, which are typically sensitive to fiber nonlinearity, another approach to provide high throughput is to enable spectrally efficient densely packed wavelength-division multiplexing (WDM) superchannel transmission. A superchannel (also written as "super-channel") is formed by combining multiple carriers (also referred to as subchannels (SCs)) to create the superchannel having a higher data rate than each individual SC. The source and destination nodes for a group of SCs that are grouped together to form a superchannel are the same and optical signals travel the same optical path from the source node to the destination node.

In a Nyquist WDM superchannel, the SCs are spaced apart by at least the Nyquist bandwidth (i.e., spaced at least by the symbol rate). This channel gap between SCs helps to ensure that there is no inter-symbol interference (ISI). Further SE improvements are possible by allowing controlled overlap of the SCs in time (via "faster than Nyquist" (FTN) signaling) or frequency or both (also known as time-frequency packing (TFP)). However, this results in ISI and/or inter-carrier interference (ICI). Additional sources of interference, such as ICI due to transceiver laser drifts, and ISI arising from components in the optical frontend (e.g., transmitter drivers or digital-to-analog converters (DACS), or in the optical link such as reconfigurable optical add-drop multiplexers (ROADMS)), can also affect the system performance.

Phase noise (PN), such as due to transmitter and receiver laser linewidth (LLW), may cause signal distortion in WDM systems. The presence of ISI and ICI complicates PN mitigation for TFP systems. Conventional carrier phase recovery (CPR) algorithms designed for Nyquist WDM systems typically cannot be directly applied to TFP systems without proper consideration of TFP-induced ISI and ICI.

It would be desirable to provide solutions that enable mitigation of PN in the presence of ISI and ICI, for TFP systems.

SUMMARY

In examples described here, systems and methods are provided, which enable PN mitigation due to time-overlapped pulse transmission (e.g., in faster-than-Nyquist (FTN) transmission), frequency-overlapped adjacent carriers (giving rise to ICI), or TFP transmissions. Disclosed examples may help to counter the impact of LLW of the transmitter and receiver lasers. In some examples, performance of the disclosed receivers may be improved compared to phase-locked loop (PLL) based solutions, which are designed for Nyquist transmissions and which tend to result in decoder failure in the presence of interference.

The present disclosure describes example methods and systems that are able to compensate for PN in the presence of ISI and ICI in TFP transmissions. The described examples also enable PN compensation caused by optical components in the optical transmission path, such as due to laser drift or bandwidth limitation due to ROADMS in the optical fiber.

The disclosed examples may enable operation with lower required optical signal-to-noise ratio (ROSNR) and/or closer Euclidean distance between symbols, compared to prior art, and may help to enable higher data rates (e.g., higher than Tbps data rates) per superchannel.

In some examples, the disclosed systems and methods make use of a unified turbo architecture for ISI/ICI and PN compensation that may help to improve SE. In some examples, a distributed sparse pilot-based initialization is used, to help avoid rotational ambiguity in equalized signals.

In some examples, the present disclosure describes a receiver for an optical signal over a first subchannel, the receiver including: a coarse phase noise (PN) estimator coupled to receive a signal from an equalizer of the receiver, and to provide a coarse PN estimation based on pilot symbols in the signal; a PN compensation module coupled to receive a signal from the equalizer and a coarse PN estimation from the coarse PN estimator, and to provide a PN-compensated signal; an inter-channel interference (ICI) cancellation module coupled to receive the PN-compensated signal from the phase noise compensation module, and to provide a ICI-cancelled signal; an inter-symbol interference (ISI) compensation module coupled to receive the ICI-cancelled signal from the ICI cancellation module, and to provide a ISI-compensated signal; a forward error correction (FEC) decoder coupled to receive the ISI-compensated signal from the ISI compensation module, and to perform iterative decoding to provide decoded bits; and an iterative PN estimator coupled to receive, from the FEC decoder, log likelihood ratio (LLR) from a decoding iteration, and to provide an iterative PN estimation to the PN compensation module; the PN compensation module being further coupled to receive the iterative PN estimation from the iterative PN estimator; the FEC decoder being further coupled to provide LLR from a decoding iteration to the ISI compensation module and to at least a second receiver for a second subchannel that is immediately adjacent in frequency to the first subchannel; the ICI cancellation module being further coupled to receive decoder output from at least the second receiver, the ICI cancellation module using the decoder output from at least the second receiver to provide the ICI-cancelled signal.

In any of the examples, the iterative PN estimator may be a least means square (LMS)-based iterative PN estimator that provides the iterative PN estimation based on a LMS calculation of symbol error.

In any of the examples, the iterative PN estimator may be configured to: store LLRS from a plurality of decoding iterations over a symbol duration; convert the stored LLRS over the symbol duration to symbol LLR for a symbol, to determine a decoded symbol; and calculate the LMS of the decoded symbol compared to a known symbol constellation.

In any of the examples, the iterative PN estimator may be a factor graph-based iterative PN estimator that provides the iterative PN estimation based on a factor graph-based calculation of symbol error.

In any of the examples, the iterative PN estimator may be configured to: store LLRS from three decoding iterations; and calculate a maximum a posteriori probability (MAP) estimate of the PN in a current iteration, based on message passing from a previous iteration and a next iteration.

In any of the examples, the ICI cancellation module may perform ICI cancellation using iterative ICI cancellation.

In any of the examples, the ICI cancellation module may perform ICI cancellation using stored known interference channel characteristics, and the ISI compensation module may perform ISI compensation using the stored known interference channel characteristics.

In any of the examples, the ISI compensation module may perform ISI compensation using maximum a posteriori probability (MAP) equalization.

In any of the examples, the ISI compensation module may convert the LLR from the decoding iteration to a symbol LLR and uses the symbol LLR together with the ISI estimation to provide the ISI-compensated signal.

In any of the examples, the ISI compensation module may perform ISI compensation using a linear ISI equalization module using a minimum mean squared error (MMSE) or decision feedback equalization (DFE) criteria.

In any of the examples, the ISI compensation module may perform ISI compensation using a frequency domain block equalizer processing N blocks of symbols together and using a zero forcing (ZF) equalizer in the frequency domain.

In some examples, the present disclosure describes an apparatus for receiving optical signals over a superchannel formed by a plurality of subchannels, the apparatus including: a plurality of receivers, each receiver receiving a respective optical signal over a respective subchannel of the superchannel, each receiver being any of the receivers described above.

In any of the examples, the plurality of receivers may be controlled to perform ICI cancellation according to a defined ICI cancellation schedule, and wherein the ICI cancellation schedule defines at least two stages, and in a first stage ICI cancellation may be performed only by a first subset of receivers for a first number of iterations.

In any of the examples, the first subset of receivers may include only receivers corresponding to respective subchannels having two immediately adjacent subchannels in the superchannel.

In any of the examples, ICI cancellation may be performed by each receiver in the first subset to cancel ICI contribution from only one immediately adjacent subchannel during the first stage.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

To achieve high throughputs, conventional coherent optical systems typically use higher order modulation (HOM) formats, or higher baud rates. However, HOM schemes may suffer from high required optical signal-to-noise ratio (ROSNR) due to reduced Euclidean distance (ED) between constellation points and therefore an increased performance degradation due to laser linewidth (LLW). Additionally, performance of HOM systems is also limited by the effective number of bits (ENOB) of the digital-to-analog converter (DAC), and is sensitive to fiber nonlinearity. Systems that employ per-carrier higher baud rates typically require increased bandwidth in the transmitter signal, which may be expensive to implement. Further, higher baud rate systems are more susceptible to optoelectronic filtering effects.

In examples described here, systems and methods are provided, which enable phase noise (PN) mitigation in systems that either employ time-overlapped pulse transmission (e.g., in faster-than-Nyquist (FTN) transmission), frequency-overlapped adjacent carriers (giving rise to inter-channel interference (ICI)), or both time and frequency overlapping (in time-frequency packing (TFP)) transmissions or are susceptible to ISI and ICI effects due to channel impairments. Compared to existing PN compensation systems, the examples described herein enable PN compensation in the presence of ICI and/or ISI. Compensating for PN in the presence of ICI introduces challenges in that the accuracy of estimation and compensation of the PN is affected by ICI. Moreover, compensation of ICI is also affected by the presence of uncompensated PN. Existing solutions designed for PN compensation only, or for ICI cancellation only, are unable to address the problem of PN compensation in the presence of ICI, and cannot be simply chained or combined in series to address this problem.

Figure 1:
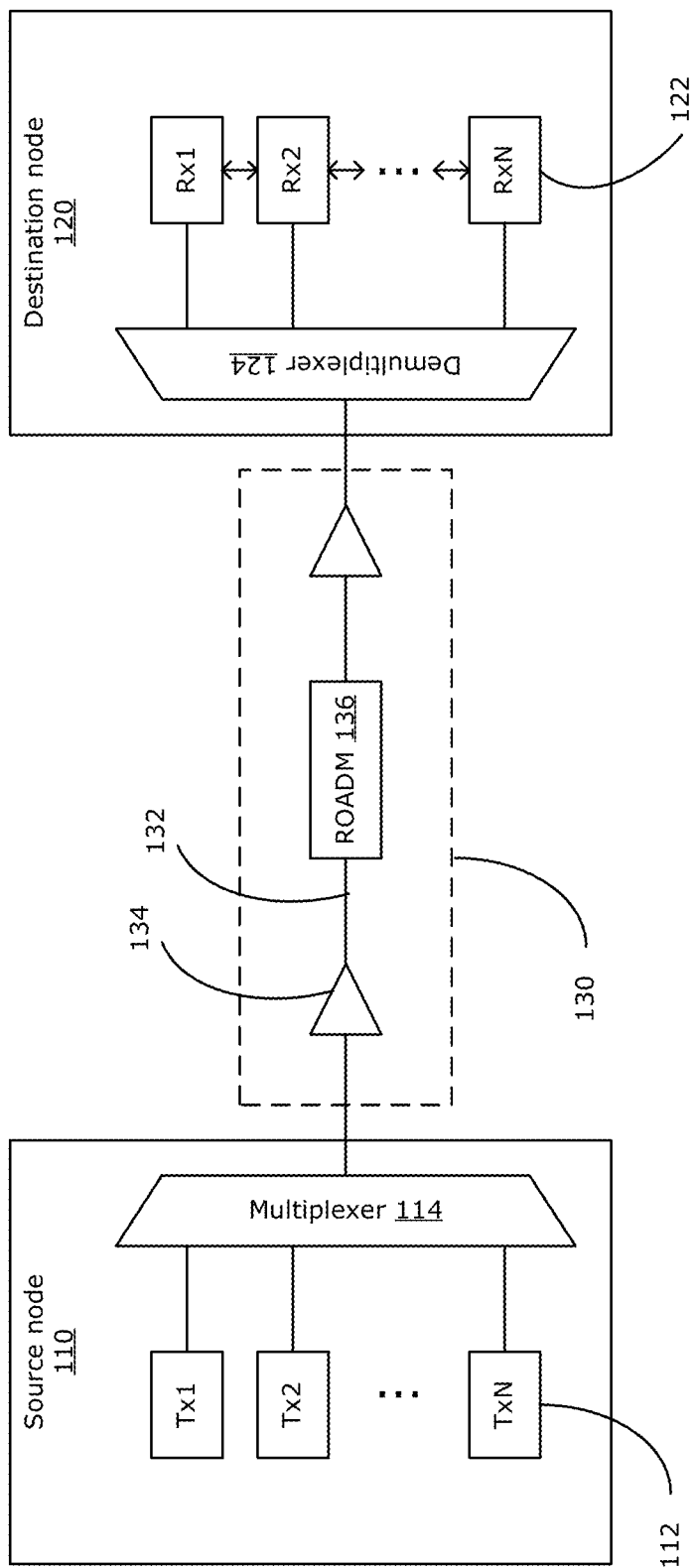
FIG. 1 is a block diagram illustrating an example system for optical transmission over a superchannel.

FIG. 1 is a block diagram of an example wavelength divisional multiplexing (WDM) system for transmission of optical signals over a coherent superchannel. A source node 110 transmits data via optical signals to a destination node 120. The source node 110 may be any source apparatus, such as any ingress or egress node of an optical transport network. Similarly, the destination node 120 may be any destination apparatus, such as another ingress or egress node of the optical transport network.

At the source node 110, multiple optical signals (modulated to carry respective data) are generated by respective transmitters 112 (denoted as Tx1 to TxN) to be carried over respective subchannels (SCs) (i.e., respective carriers over different adjacent wavelengths). The multiplexer 114 combines the optical signals from the transmitters 112 into a multiplexed optical signal, to be carried over a fiber optic channel 130. There are typically multiple optoelectronic components at the frontend of the source and destination nodes and along the optical fiber, such as amplifiers 134 and a reconfigurable optical add-drop multiplexer (ROADM) 136, among others.

The signal is received at the destination node 120. A demultiplexer 124 separates the signal into respective SCs, which are received by respective receivers 122 (denoted as Rx1 to RxN). Each SC is received by a respective receiver 122, and each receiver 122 decodes the signal received on the respective SC.

Each of the source and destination nodes 110, 120 use a laser as a local oscillator to modulate the optical signal on to the requisite transmit frequency and to demodulate it to a baseband signal. Practical lasers, for example electronic cavity lasers (ECL), have a non-zero laser linewidth which can be of the order of hundreds of kilohertz (KHz). A non-zero laser linewidth (LW) due to the transmit and receive lasers leads to phase noise in the received signal and may lead to significant performance degradation. To help in understanding the present disclosure, the effect of phase noise on the transmitted signal is described.

The baseband equivalent transmitted signal for the cross-polarization of the dual-polarized TFP superchannel may be represented as $s_x(t)$ where:

$$s_x(t) = \sum_l \sum_m x_m[l] p(t - l\tau T) e^{j(2\pi(m - \frac{N+1}{2})\Delta f t + \theta_{tx}^{(m)}(t))} \quad (1)$$

where l and m denote the symbol index and the SC index, respectively; p is the pulse-shaping filter (e.g., root-raised-cosine (RRC) filter with roll-off factor $\beta$); N is the total number of SCs in the superchannel; T is the symbol duration; $x_m[l]$ is the modulated symbol for the $m^{th}$ SC at the $l^{th}$ time for the X– polarization;

$$\Delta f = \xi \frac{1 + \beta}{T}$$

is the frequency-spacing between the adjacent SCs; $\tau$ and $\xi$ are the time and frequency compression ratios (alternatively known as acceleration factors), respectively, such that $\tau = \xi = 1$ corresponds to the Nyquist WDM system; and $\theta_{tx}^{(m)}(t)$ is the time-varying PN at the transmitter for the $m^{th}$ SC.

Lasers are used at the transmitter and receiver of each SC, for generating and demodulating the optical signal respectively. In a discrete-time baseband model, for the $m^{th}$ SC, the PN at the transmitter laser (denoted as $\theta_{tx}^{(m)}[k]$) and the PN at the receiver laser (denoted as $\theta_{rx}^{(m)}[k]$) may be respectively represented as:

$$\theta_{tx}^{(m)}[k] = \theta_{tx}^{(m)}[k-1] + \Delta_{tx}^{(m)} w_{tx}^{(m)}[k] \quad (2)$$

$$\theta_{rx}^{(m)}[k] = \theta_{rx}^{(m)}[k-1] + \Delta_{rx}^{(m)} w_{rx}^{(m)}[k] \quad (3)$$

where k is the sample-index corresponding to the discrete time baseband model; $w_{tx}^{(m)}$ and $w_{rx}^{(m)}$ are independent identically distributed standard Gaussian random variables at the transmitter and the receiver, respectively; $\Delta_{tx}^{(m)}$ and $\Delta_{rx}^{(m)}$ are the Wiener process standard deviations at the transmitter and the receiver, respectively, and $\Delta_{tx}^{(m)} = \Delta_{rx}^{(m)} = \sqrt{2\pi f_W T_s}$, with $T_s$ being the sampling time in seconds and $f_W$ being the LLW in Hz (i.e., the full-width half maximum spectral bandwidth of the transmitter and the receiver lasers, respectively).

Figure 2:
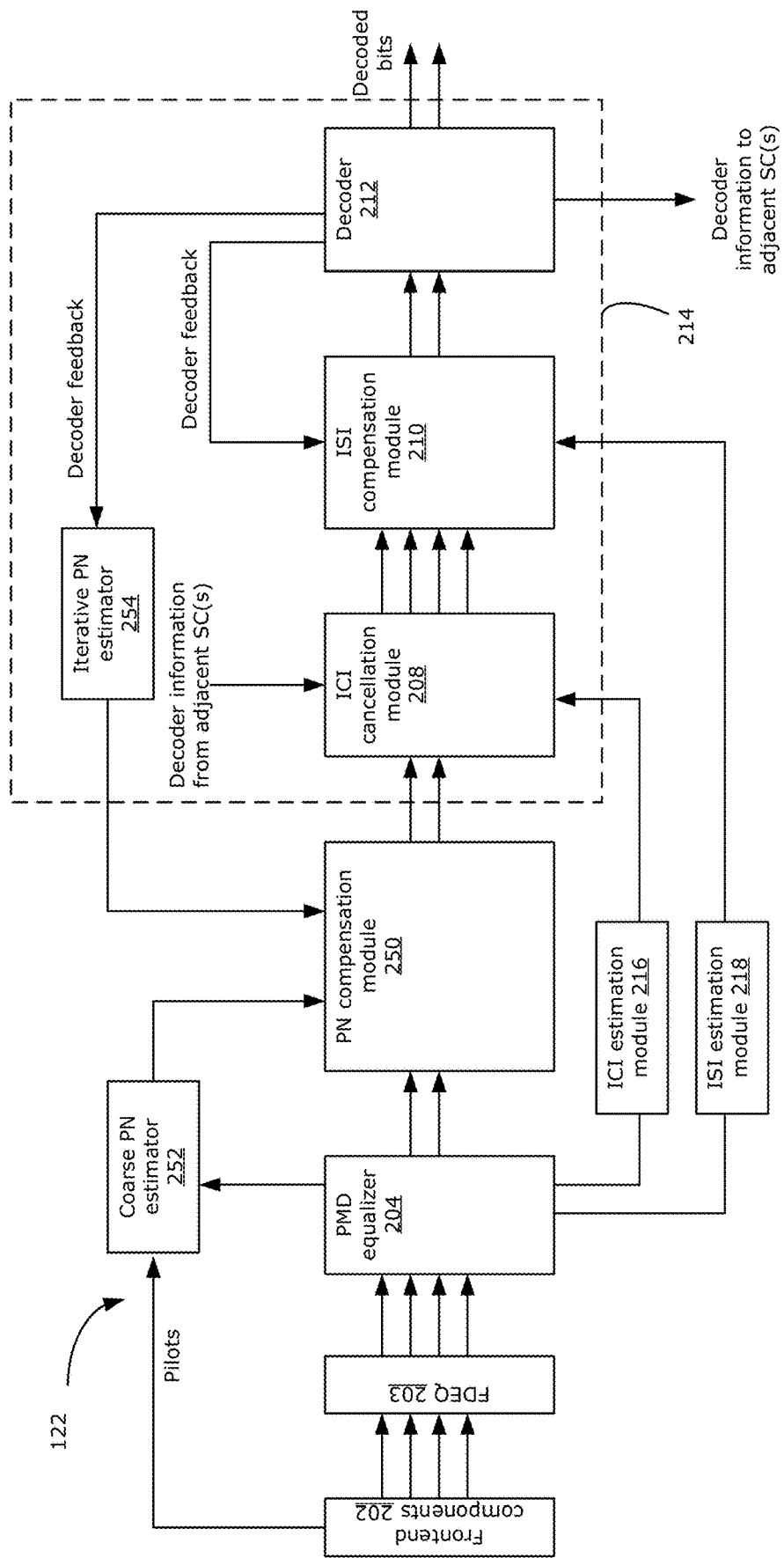
FIG. 2 is a block diagram illustrating an example receiver architecture for performing phase noise compensation and decoding received optical signals.

FIG. 2 is a block diagram of the architecture at one receiver 122 (corresponding to one SC) of the destination node. The architecture shown may be replicated for each receiver 122 (corresponding to each SC) at the destination node.

In the present disclosure, reference will be made to "coarse" PN estimation. Coarse PN estimation refers to feedforward-only estimation of PN, based on pilot symbols in the received signal. The present disclosure also refers to "iterative" PN estimation. Iterative PN estimation refers to estimation of PN that makes use of feedback from an iterative equalizer. Coarse PN estimation is used when there is no information available from the decoder, for example when the received signal is being processed prior to a first decoding attempt. In some instances, the coarse PN estimation may be considered a special-case first iteration of the iterative PN estimation. To avoid confusion, the present disclosure will refer to the coarse PN estimation as being separate from the iterative PN estimation, although it should be understood that in some contexts the coarse PN estimation and the iterative PN estimation may be considered to be a single PN estimation process. The coarse PN estimation may also be referred to as a non-iterative PN estimation, a pre-iterative PN estimation, or a preliminary PN estimation, for example. The iterative PN estimation may also be referred to as a feedback-based PN estimation, for example.

In FIG. 2, some details of the receiver 122 have been simplified for ease of understanding. For example, the frontend components 202 of the receiver may be a simplification of one or more frontend components. For example, the frontend components 202 may include an optical frontend (including a photodetector and a transmitter impedance amplifier, for example) and an analog-to-digital converter (ADC). The digitized received signal from the ADC may be passed through a frequency domain equalizer (FDEQ) 203 (for chromatic dispersal compensation (CDC) and other frontend compensation, for example), among other possible modules. In particular, FDEQ performs CDC and compensates for other frontend impairments using matched filtering.

The digitized and CD compensated received signal is outputted by the FDEQ 203 to a polarization mode dispersion (PMD) equalizer 204. The PMD equalizer 204 may be a multiple-input multiple-output (MIMO) equalizer (e.g., a 2×2 MIMO equalizer, which can be either a time-division (TD) equalizer or a frequency-division (FD) equalizer). Equalization of PMD produces compensated (or "clean") pilot symbols that are used by a PN compensation module 250 for coarse PN estimation during a feed-forward stage, as will be discussed further below. Furthermore the output of the PMD equalizer 204 is further utilized by an ICI estimation module 216 and an ISI estimation module 218 that dynamically update the corresponding estimates as the signal is processed. It may be noted that, because the rate of change of ISI and ICI in the SCS is expected to be relatively slow compared to the effects (e.g., differential group delay (DGD) and state of polarization (SoP) rotation of the optical signal) compensated by the PMD equalizer 204, the ICI estimation module 216 and the ISI estimation module 218 may be separate from and operate at a slower rate than the PMD equalizer 204 (thus having insignificant effect to the complexity of the overall system). The ICI estimates and the ISI estimates from the ICI estimation module 216 and the ISI estimation module 218, respectively, are used by an ICI cancellation module 208 and an ISI compensation module 210, respectively, as discussed further below. The output of the PMD equalizer 204 is also provided to a coarse PN estimator 252 that produces a coarse PN estimation which is used by the PN compensation module 250 for performing PN compensation in a feed-forward manner. The output of the PN compensation module 250 is fed to the ICI cancellation module 208, and then the output of the ICI cancellation module 208 is subsequently provided to the ISI compensation module 210. The ISI-compensated signal is then provided as input to a decoder 212 (e.g., a FEC or soft-FEC decoder).

The decoder 212 performs iterative decoding of the received signal. The decoder 212 calculates log-likelihood ratios (LLRS) of bit values during decoding of the signal, which may be considered "soft" information generated by the decoder 212. In the present disclosure, soft information may refer to decoder output that indicates a likelihood or confidence of the bit value being "1" or "0" (rather than a definitive or "hard" binary decision) and may provide information that can be used in a subsequent decoding iteration, for example. Such soft information may be probabilistic in nature (e.g., LLR). In contrast to soft information, a symbol that has been definitively decoded by the decoder 212 may be referred to as "hard" information, a "hard" decision, or a "hard" decoded symbol. As will be discussed further below, soft information generated by the decoder 212 (including both soft information and hard decoded symbols) is fed back to the ISI compensation module 210 to improve the ISI compensation in a subsequent iteration, and is also fed back to an iterative PN estimator 254, which provides an improved PN estimate to the PN compensation module 250 in a feedback manner. Further, soft information generated from the decoder 212 is also fed to another receiver (not shown) for at least one adjacent SC. It should be noted that a LLR converter (not shown in FIG. 2) may be used in some embodiments to convert bit LLRS in the feedback information to symbol LLRS, as discussed further below. In some examples, the ICI compensation module 208, the ISI compensation module 210, the decoder 212 and the iterative PN estimator 254 may be implemented within a turbo equalizer 214.

As will be discussed further below, the coarse PN estimator 252 and the iterative PN estimator 254 generate respective estimation of PN to enable the PN compensation module 250 to perform PN compensation. In a feed-forward only stage of PN compensation the coarse PN estimator 252 is used, whereas in a feedback stage of PN compensation the iterative PN estimator 254 is used.

In the present disclosure, an immediately adjacent SC (or simply adjacent SC) that is immediately adjacent to a given SC means that the immediately adjacent SC is the SC that is closest in frequency to the given SC (i.e., is adjacent in the frequency domain). For a superchannel formed by closely packing multiple SCs, adjacent SCs may be separated by a channel gap (i.e., a frequency separation) that is narrower than the Nyquist bandwidth, the channel gap may be zero (i.e., adjacent SCs abut each other in frequency), or the channel gap may be negative (e.g., there is overlap of the tail regions of adjacent SCs). A SC that has only one adjacent SC may be referred to as an edge SC. An edge SC is a SC having the highest frequency band or the lowest frequency band in the superchannel. A SC that has two adjacent SCs may be referred to as an inner SC.

Details of an example operation of the receiver 122 are now described, beginning with PN compensation in a feed-forward-only stage using the coarse PN estimator 252. During coarse PN estimation, feedback information from the decoder 112 is not available, and the iterative PN estimator 254 is not used. As mentioned above, the cascade of the FDEQ 203 and PMD equalizer 204 provides equalized pilot symbols. After performing the chromatic dispersion (CD) equalization, pilot symbols may be used to ensure the convergence of the PMD equalizer 204. The equalized pilot symbols are also provided to the coarse PN estimator 252, along with the equalized symbols from the PMD equalizer 204. The coarse PN estimator uses the pilot symbols to perform a feedforward-only coarse PN estimation. Various techniques may be used to perform a coarse PN estimation using pilot symbols. For example, a least squares approach or autocorrelation approach may be used to calculate a coarse PN estimation for each pilot (which may be further refined by interpolating over several distributed pilots in the received symbol frame). The coarse PN estimation is used by the PN compensation module 250 for PN compensation.

The equalized symbols from the PMD equalizer 204 are also used by the ICI estimation module 216 and the ISI estimation module 218 to provide ICI estimates and ISI estimates, respectively (e.g., using least mean square (LMS) estimations). In some examples, during the feedforward-only stage, a preamble transmission (e.g., a stream of training sequences) may be used, instead of pilot symbols, to help expedite the initial convergence. The preamble transmission may use symbols that are binary phase-shift keying (BPSK) or quadrature phase-shift keying (QPSK) modulated symbols, and chosen from a sequence with good correlation properties.

Generation of the ICI estimation and the ISI estimation is now described. In the following discussion, column vector $a_k^{(m)}$ is used to denote the constellation symbols to be decoded from the received signal, the column vector $u_k^{(m)}$ to denote the input samples (i.e., the digitized and CDC-compensated signal provided from the FDEQ 203) to the PMD equalizer 204. These column vectors are formulated by stacking the X and Y polarized signals of the $m^{th}$ SC at the $k^{th}$ sample time. The PMD equalizer 204 calculates the LMS-based error signal, denoted as $\epsilon_k^{(m)}$, as the difference between the phase-rotated PMD filter output and the "desired signal", using equation (4) below. The PMD filtered output, denoted as $z_k^{(m)}$, is calculated as shown in equation (5) below. The calculation of the desired signal, denoted as $d_k^{(m)}$ in the following equations, incorporates the effects of the TFP interference into the clean pilot symbols, as shown in equation (6) (as indicated by the terms $h_{j,k}^{(m)}$ and $g_{v,k}^{(n,m)}$ denote the TFP ISI channel and TFP ICI channel, respectively; and the terms $a_{k-j}^{(m)}$ and $\hat{a}_{k-v}^{(n)}$ denoting the pilot symbols and frequency-rotated pilot symbols, respectively). The combined error signal vector with the X and Y polarization symbols is written as $$\epsilon_k^{(m)} = [\epsilon_{k,x}^{(m)} \epsilon_{k,y}^{(m)}]^T = z_k^{(m)} \odot \left[ e^{-j\theta_{x,k}^{(m)}}, e^{-j\theta_{y,k}^{(m)}} \right]^T - d_k^{(m)} \quad (4)$$

$$z_k^{(m)} = [z_{x,k}^{(m)} z_{y,k}^{(m)}]^T = \sum_{i=0}^{N_w-1} W_{i,k}^{(m)} u_{k-i}^{(m)} \quad (5)$$

$$d_k^{(m)} = [\delta_{k,x}^{(m)} \delta_{k,y}^{(m)}]^T = \sum_{j=-L_s}^{L_s} h_{j,k}^{(m)} \odot a_{k-j}^{(m)} + \sum_{n \neq m} \sum_{v=-L_c}^{L_c} g_{v,k}^{(n,m)} \odot \hat{a}_{k-v}^{(n)} \quad (6)$$

In the above equations, $\epsilon_{k,x/y}^{(m)}$, $\epsilon_{k,x/y}^{(m)}$ and $\delta_{k,x/y}^{(m)}$ denote respectively the error signal, PMD filtered output and the desired signal corresponding to the X or the Y polarization (the subscript x/y meaning "X respectively Y") for the $m^{th}$ SC at the $k^{th}$ sample time; $[e^{-j\Theta_{x,k}^{(m)}}, e^{-j\Theta_{y,k}^{(m)}}]^T$ represents the phase rotation; $W_{i,k}^{(m)}$ represents the $i^{th}$ matrix-tap of the T/2-spaced PMD equalizer 204; $N_w$ represents the total number of PMD filter taps in the PMD equalizer 204; $h_{j,k}^{(m)}$ and $g_{v,k}^{(n,m)}$ are the j-th and the v-th symbol-spaced ISI and ICI tap vectors (which represent the respective ISI and ICI channels), respectively, with $L_s$ and $L_c$ being the total number of ISI and ICI channel taps, respectively; $[\ldots]^T$ denotes the transpose of a vector; $\odot$ denotes the elementwise vector product; and $\hat{a}_k^{(n)} = a_k^{(n)} e^{\pm j 2\pi \Delta f k}$ denotes the rotated constellation symbol for the n-th SC, with ±sign determined based on the relative positions of the SCs. It should be noted that, conventionally (in the absence of ISI and ICI), the desired signal $d_k^{(m)}$ is typically the known pilot symbol (which is subtracted in equation (4) to generate the error signal $\epsilon_k^{(m)}$). In the present disclosure, the desired signal $d_k^{(m)}$ is expressed as shown in equation (6) to reflect the presence of ISI and ICI.

The mean square error (MSE), denoted as $MSE_{Tot}$, is defined as $$MSE_{Tot} = \mathbb{E}\left(\sum_{m=1}^{N} \|\epsilon_k^{(m)}\|^2\right) \quad (7)$$

In some examples, the following constraints on the ISI and ICI channel may be employed to simplify the estimation complexity:

$$h_{j,k}^{(m)} = (h_{j,k}^{(m)})^* \text{ and } h_{j,k}^{(m)} = -h_{-j,k}^{(m)} m \in \{1,2,\ldots,N\}, -L_s \leq j \leq L_s \quad (8)$$

$$g_{v,k}^{(n,m)} = (g_{v,k}^{(n,m)})^*, n \in \{1,2,\ldots,N\}, -L_c \leq j \leq L_c \quad (9)$$

It should be understood that the constraints defined in equations (8) and (9) above represent a symmetry assumption that may be applied in some examples in order to lower the complexity. However, these constraints are not mandatory, and omission of these constraints do not affect the performance of the present disclosure. Assuming the above constraints are enforced (e.g., for simplifying computational complexity), then the equations for LMS update for the PMD equalizer 204, ISI channel, ICI channel, and coarse PNE 252 are given by, respectively, $$W_{\alpha,k+1}^{(m)} = W_{\alpha,k}^{(m)} - \mu_w([e^{j\Theta_{x,k}^{(m)}}, e^{j\Theta_{y,k}^{(m)}}]^T \odot \epsilon_k^{(m)})(u_{k-\alpha}^{(m)})^H \quad (10)$$

$$h_{\beta,k+1}^{(m)} = h_{\beta,k}^{(m)} + \mu_w \text{Re}[(\epsilon_k^{(m)} \odot (a_{k-\beta}^{(m)} + a_{k+\beta}^{(m)})^*)] \quad (11)$$

$$g_{\gamma,k+1}^{(n,m)} = g_{\gamma,k}^{(n,m)} + \mu_g(\epsilon_k^{(m)} \odot (\hat{a}_{k-\gamma}^{(n)})^* + (\epsilon_k^{(m)})^* \odot \hat{a}_{k-\gamma}) \quad (12)$$

$$\theta_{\substack{x\\y},k+1}^{(m)} = \theta_{\substack{x\\y},k}^{(m)} + \mu_\theta Im\left[\left(\delta_{\substack{x\\y},k}^{(m)}\right)^* z_{\substack{x\\y},k}^{(m)} e^{-j\theta_{\substack{x\\y},k}^{(m)}}\right] \quad (13)$$

where $\mu_w > 0$, $\mu_h > 0$, $\mu_g > 0$, and $\mu_\theta > 0$ are the step size parameters, Re[•], Im[•], (•)* and (•)$^H$ denote the real-part, imaginary, complex conjugation and matrix Hermitian operations, respectively.

To initiate the above adaptive estimation calculations and accomplish LMS convergence, a continuous block of pilot symbols may be transmitted at the beginning of data transmission, which is often referred to as the signal acquisition stage. Thereafter, blocks of $N_p$ contiguous periodic pilot symbols are inserted uniformly after every $N_d$ data symbols, for the entire transmission duration (such insertion of pilot symbols throughout a transmission may be referred to as distributed pilots) whereby typically $N_d \gg N_p$. The insertion of pilots throughout the transmission helps to track phase noise, which is a time-varying process. During such a distributed pilot transmission, the coarse PN estimator 252, the PMD equalizer 204, and the ICI channel taps are slowly adjusted to account for PN tracking, rotation of the principal states of polarization (PSP), and slowly time-varying laser drifts, respectively. The pilot symbols density, denoted as $$p = \frac{N_p}{N_p + N_d},$$

is chosen to meet a desired tradeoff between performance and transmission overhead. It should be understood that there are different approaches to introducing pilots in the transmission, and the examples described herein are not limited to any particular pilot transmission scheme. Because the ISI taps are expected to change relatively slowly (compared to frame durations) during the course of the transmission, the ISI impulse response can potentially be estimated only once during the signal acquisition stage, followed by very slow adjustments based on a user defined criteria and/or other criteria that are indicative of the link performance such as the post-FEC error rate.

The PN estimation performed by the coarse PN estimator 252, obtained using the distributed pilots, can be interpolated (e.g., using linear interpolation) to account for PN variation over the intermediate symbols located between two pilot symbols. The interpolated coarse PN estimates are then used as a basis for iterative PN mitigation calculations in the feedback stage of PN compensation, as detailed further below.

The TFP-induced interference can be considered to be a priori known. For example, because the amount of pulse and sub-channel overlap (and hence the amount of intentionally introduced ISI and ICI) is controlled at the source node, this information can be made available to the destination node. However, due to the impairments introduced by the various elements of the fiber-optic channel and network element behaviour, additional interference may be experienced by signal that can cause severe performance degradation if not addressed appropriately. Therefore, accurate channel estimation performed at the destination node, for example as described above, improves performance by accurately estimating the actual interference that affects the transmitted signal. Moreover, such channel estimation can also help to account for the effects of additional electrical/optical filtering, such as the ISI caused by the low pass filtering behavior of the electrical component such as DAC, drivers as well as optical filtering due to ROADMS along the optical fiber, and the ICI due to laser drifts. The carrier phase recovery (CPR) described above, which is performed by the PN compensation module 250 using the feedforward-only PN estimation from the coarse PN estimator 252, enables better ISI and ICI channel estimation by minimizing the overall MSE during the first iteration of the frame where no FEC feedback is available.

Although the coarse PN estimation enables compensation of PN based on distributed pilot symbols, the coarse PN estimation may not be able to compensate for PN that varies between blocks of pilot symbols. Furthermore, the coarse PN estimation works on symbols that have not been compensated for ISI and ICI yet. Thus, there may be considerable residual PN remaining in the coarse PN compensated signal. Nonetheless, the coarse PN estimation and compensation provides a basis for the more accurate and effective iterative PN compensation, as discussed below.

During iterative PN estimation, feedback information from the FEC decoder 212 is available and the iterative PN estimator 254 is used, while the coarse PN estimator 252 is not used. Soft information from the decoder 212 are used to iteratively mitigate the effects of ISI, ICI, and residual PN. During each iteration of the iterative equalization, soft information (e.g., the a posteriori LLRS) from the decoder 212 are fed back to the earlier stages of the turbo equalization structure for use in subsequent iterations. For example, this feedback information is used for interference cancellation, and iterative PN estimation and compensation. It should be noted that, in the present disclosure, "iteration" refers to an iteration in the equalization process and not an iteration within the decoder 212. That is, an iteration in the present disclosure takes place with feedback from the decoder 212 is provided to the iterative PN estimator 254, the ISI compensation module 210 and to the ICI cancellation module 208 in adjacent SC(s).

The ISI and ICI estimates, as discussed above, are also fed as inputs to the ISI compensation module 210 and the ICI cancellation module 208, respectively, for interference mitigation. In an alternative embodiment, if channel estimation is not performed as discussed above (e.g., if only TFP-induced ISI and ICI is to be compensated, for example if a separate equalizer is used in a separate stage to compensate for known (non-ISI, non-ICI) TFP-interference), the interference channel can be pre-computed and stored as a priori known interference channel for a given value of pulse roll-off factor $\beta$, time domain compression factor r and frequency overlap ratio $\xi$, as governed by system design. In embodiments where channel estimation is not performed, the stored known interference channel may be used by for interference cancellation calculations. For example, the ISI compensation module may use a frequency domain block equalizer to perform ISI compensation, by processing N blocks of symbols together, and using a zero forcing (ZF) equalization in the frequency domain.

Before performing ISI compensation, in each global iteration, decoder information from at least one adjacent SC (e.g., up to two adjacent SCs in the case where the receiver 122 is for an inner SC) is fed back from the decoder(s) of the respective adjacent SC(s) (also referred to as adjacent decoder(s), for simplicity) to the ICI cancellation module 208. Prior to a first decoding iteration, there is no feedback information available from the adjacent decoder(s), and no ICI cancellation is performed by the ICI cancellation module 208.

When information from adjacent decoder(s) are available, iterative ICI cancellation techniques may be used by the ICI cancellation module 208. Some suitable examples of iterative ICI cancellation include successive interference cancellation (SIC), parallel interference cancellation (PIC), and a combination of SIC and PIC. In SIC, ICI due to each adjacent SC is removed by the ICI cancellation module 208 sequentially according to some defined order (e.g., in order of decreasing magnitude of estimated signal-to-interference-and-noise ratio (SINR)). In PIC, ICI cancellations for all SCs are initiated at the same time for each global iteration. If a combination of SIC and PIC is used, ICI cancellation may be scheduled for the SCs up to a defined global iteration threshold (e.g., for the first 10 iterations), followed by PIC for the remainder of iterations until a maximum number N of iterations is reached. The maximum number of iterations can be a fixed value set by the system designer or governed by an intermediate decoding criteria such as no errors being found in the output after the FEC decoder.

Following ICI cancellation in each iteration, a suitable ISI equalization technique is used to perform ISI compensation, separately for each individual SC. For ISI compensation, feedback (e.g., soft information in the form of LLRS) from the decoder 212 of the same SC is used to iteratively improve the performance of the ISI compensation module 210. Some suitable examples of ISI compensation include using maximum a posteriori probability (MAP) equalization (e.g., using Bahl-Cocke-Jelinek-Raviv (BCJR) algorithm), or soft linear ISI cancellation working on a minimum mean square error (MMSE) or decision feedback equalization (DFE) criteria.

Figure 3:
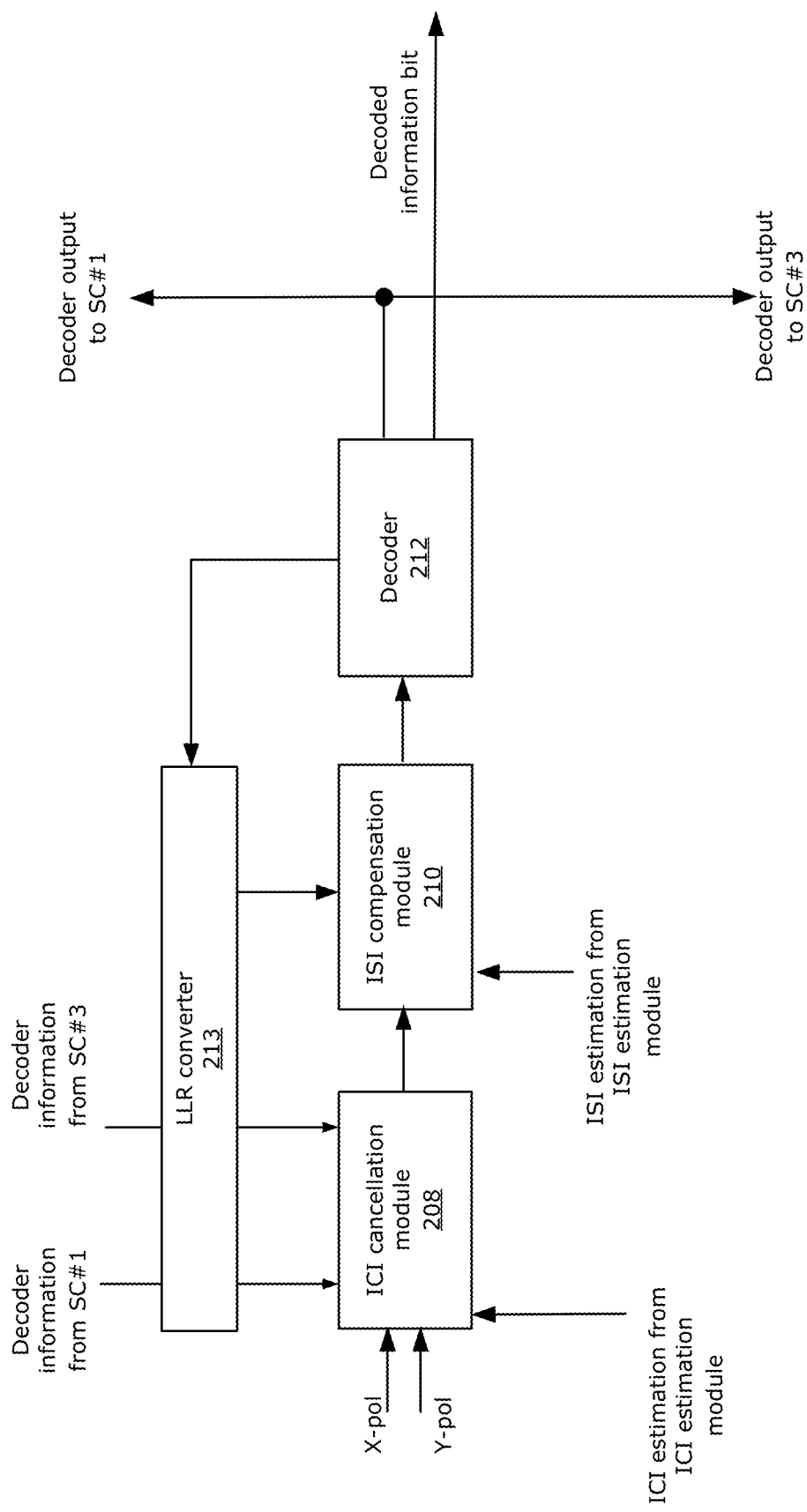
FIG. 3 is a block diagram providing details of ICI cancellation and ISI compensation in the receiver architecture of FIG. 2.

FIG. 3 is a block diagram illustrating some example details of ICI cancellation and ISI compensation. In this example, the ICI cancellation module 208, ISI compensation module 210 and decoder 212 for SC #2 is shown. SC #2 in this example is an inner SC, with two adjacent SCs (e.g., higher frequency adjacent SC SC #1, and lower frequency adjacent SC SC #3).

The ICI cancellation module 208 receives, from the PN compensation module 250, the PN compensated X- and Y-polarized signals (denoted as "X-pol" and "Y-pol", respectively, in FIG. 3) that have the impact of CD and PMD removed through the FDEQ 203 and PMD equalizer 204 respectively. The ICI cancellation module 208 also receives, from the ICI estimation module 216, the ICI tap update. The ICI cancellation module 208 also receives, from adjacent FEC decoders belonging to SC #1 and SC #3, respective decoder output in the form of soft information. In particular, the ICI cancellation module 208 receives, from each adjacent decoder, bit LLRS that are produced at the output of the decoder of the adjacent SC (e.g., after a defined number of decoding iterations of the FEC decoder). The bit LLRS may be converted to symbol LLR by a LLR converter 213. For example, the LLR converter 213 may use the bit probabilities (represented by the bit LLRS) over a symbol length to calculate symbol probabilities (represented by symbol LLR) by multiplying the corresponding bit probabilities for each symbol. This enables the ICI cancellation module 208 to cancel the ICI impact from the adjacent SC(s). The ICI cancellation module 208 performs ICI cancellation (e.g., using iterative ICI cancellation techniques as described above) and provides the ICI-cancelled signal to the ISI compensation module 210.

The ISI compensation module 210 receives, from the ISI estimation module 218, the ISI tap update. The ISI compensation module 210 also receives, from the decoder 212, feedback information in the form of LLR. In this example, the bit LLR generated by the decoder 212 may be converted to symbol LLR by the LLR converter 213 (FIG. 3 shows a single LLR converter 213 that performs the bit LLR to symbol LLR conversion for feedback to the ICI cancellation module 208 and the ISI compensation module 210, however it should be understood that in other examples there may be separate LLR converters 213). The ISI compensation module 210 uses the ISI tap updates, the a posteriori soft information from the FEC decoder 212 and the output of the ICI cancellation module 208 to perform ISI compensation (e.g., using ISI compensation, as discussed above). The ISI-compensated signal is provided to the decoder 212, which performs iterative soft decoding. Output from the decoder 212 is fed back to the ISI compensation module 210 in the form of LLR after each decoding iteration. The decoded symbol from the decoder 212 (e.g., after a defined number of iterations) is also provided to the adjacent SCs, in particular the ICI cancellation modules of the adjacent SCs. The decoded information bits (e.g., decoded bits in both X- and Y-polarizations) provided as hard information from the decoder 212 are also provided as the output from the receiver of SC #2.

It should be noted that because ICI cancellation makes use of information from adjacent SC(s), scheduling of ICI cancellation across the multiple SCs of the superchannel affects performance of the overall system. The schedule for ICI cancellation across the SCs may be implemented by the core logic of the receiver (e.g., through the finite state machine (FSM) of the ASIC or other embedded processor). Operation of the ICI cancellation module 208 tends to be costly (e.g., having a high power consumption), and scheduling of ICI cancellation can be used to reduce operation of the ICI cancellation module 208 (e.g., to achieve faster convergence) where appropriate. For example, inner SC(s) are expected to suffer greater ICI than edge SCs and hence require more iterations for successful ICI cancellation. Accordingly, ICI cancellation may be scheduled to start with only inner SC(s) for a defined number of iterations (e.g., first 2-5 iterations), and ICI cancellation for edge SCs may be scheduled to start only after the defined number of iterations has been performed by the ICI cancellation modules 208 of the inner SC(s). Further, ICI cancellation may be scheduled to cancel ICI contribution from only one SC immediately adjacent to an inner SC, as discussed below. The cancellation of ICI contribution from only one immediately adjacent SC (noting that, for an inner SC, there are two immediately adjacent SCs), may be referred to as "one-sided" ICI cancellation. ICI cancellation that cancels ICI contribution from all immediately adjacent SCs may be referred to as "full" ICI cancellation.

Figure 4A:
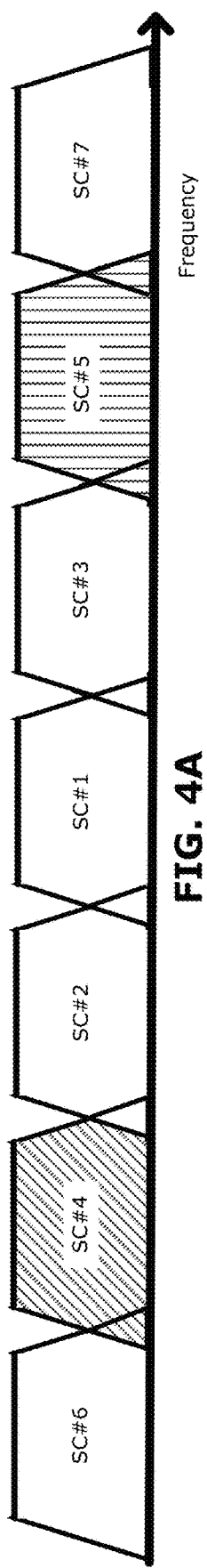
FIGS. 4A-C and 5A-C illustrate examples of ICI cancellation scheduling, for a superchannel having an odd number and an even number of subchannels, respectively.
Figure 4B:
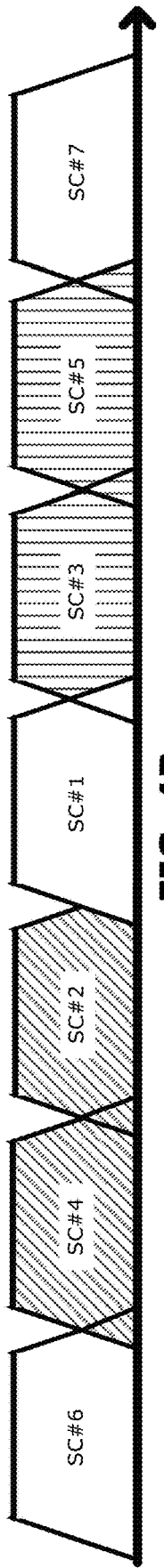
Figure 4C:
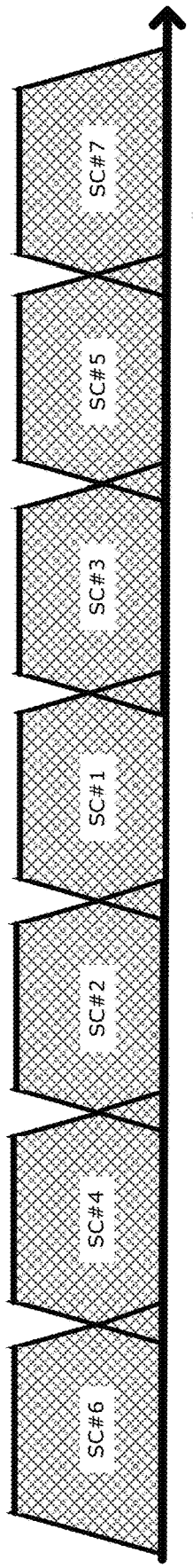

FIGS. 4A-C illustrate an example of ICI cancellation scheduling where there is an odd number of SCs in the superchannel (in this example, 7 SCs). Specifically, there are two edge SCs (indicated as SC #6 and SC #7), one innermost SC (or middle SC, because it is centered in the middle of the superchannel bandwidth) (indicated as SC #1), two second outermost SCs (which are adjacent to the respective edge SCs) (indicated as SC #4 and SC #5), and two third outermost SCs (which are adjacent to the second outermost SCs and the innermost SC) (indicated as SC #2 and SC #3). FIGS. 4A-C illustrate ICI cancellation over a number of iterations.

FIG. 4A illustrate the ICI cancellation that is performed by a first subset of SCs for a first number of iterations. The first subset of SCs are the second outermost SCs (in this example, SC #4 and SC #5), and the first number of iterations is from the first iteration up to a defined first threshold of iterations. As shown in FIG. 4A, ICI cancellation starts first in the second outermost SCs only. The ICI cancellation in each second outermost SC is performed to cancel the ICI contribution from only the respective edge SC. Thus, ICI cancellation for the SC #4 cancels the ICI contribution from only SC #6 (indicated by diagonal hatch lines); and the ICI cancellation for SC #5 cancels the ICI contribution from only SC #7 (indicated by vertical hatch lines). This is performed up to the first threshold number of iterations.

FIG. 4B illustrate the ICI cancellation that is performed by a second subset of SCs for a second number of iterations immediately following the first number of iterations. The first subset of SCs are the second outermost SCs (in this example, SC #4 and SC #5) and the third outermost SCs (in this example, SC #2 and SC #3), and the second number of iterations is from the iteration immediately following the defined first threshold up to a defined second threshold of iterations. As shown in FIG. 4B, ICI cancellation is now performed by second outermost SCs and third outermost SCs. The ICI cancellation in this second subset of SCs is performed to cancel the ICI contribution from only the adjacent SC that is closest to (or is) the nearest edge SC. Thus, ICI cancellation for SC #4 cancels the ICI contribution from only SC #6 and ICI cancellation for SC #2 cancels the ICI contribution from only SC #4 (indicated by diagonal hatch lines). The ICI cancellation for SC #5 cancels the ICI contribution from only SC #7 and ICI cancellation for SC #3 cancels the ICI contribution from only SC #5 (indicated by vertical hatch lines). This is performed up to the second threshold number of iterations.

FIG. 4C illustrate the ICI cancellation that is performed by all SCs for a third number of iterations immediately following the second number of iterations. The third number of iterations is from the iteration immediately following the defined second threshold up to a maximum number of iterations. As shown in FIG. 4C, all SCs now perform ICI cancellation. ICI cancellation is performed by each SC to cancel the ICI contribution from all immediately adjacent SCs (indicated by cross-hatch lines). For example, edge SCs (in this example, SC #6 and SC #7) cancel ICI contributions from only one immediately adjacent SC, and inner SCs (in this example, SC #1-SC #5) cancel ICI contributions from two immediately adjacent SCs.

Although FIGS. 4A-C illustrate ICI cancellation scheduling for a specific number of SCs, it should be understood that a similar ICI cancellation scheduling may be used for any number of SCs within a superchannel. Generally, one-sided ICI cancellation is scheduled "inwards" (i.e., towards the centermost SC) starting from the second outermost SC, with the one-sided ICI cancellation being performed to account only for the ICI contribution from the immediately adjacent SC that is closest to (or is) the nearest edge SC). One or more stages of one-sided ICI cancellation is scheduled to be performed for successive subsets of SCs, each stage being performed for a defined number of iterations (e.g., up to a threshold number of iterations per stage). Finally, after one-sided ICI cancellation has been performed for SCs excluding the edge SCs and the centermost SC (only present for odd-numbers of SCs), full ICI cancellation is performed for all SCs (including the edge SCs). Full ICI cancellation accounts for the ICI contribution from all immediately adjacent SCs. Such a scheduling approach may be used for any number of SCs.

Figure 5A:
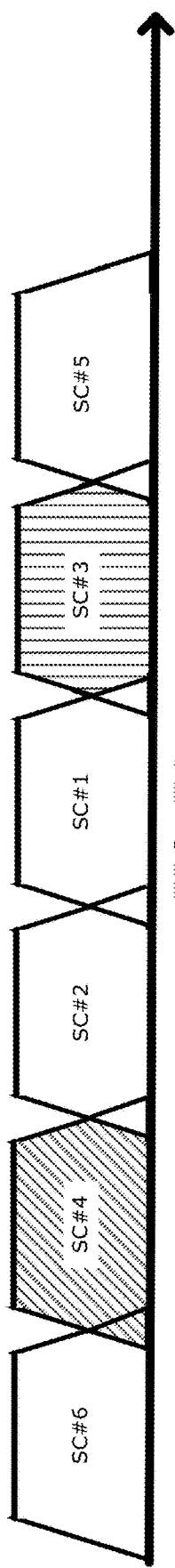
Figure 5B:
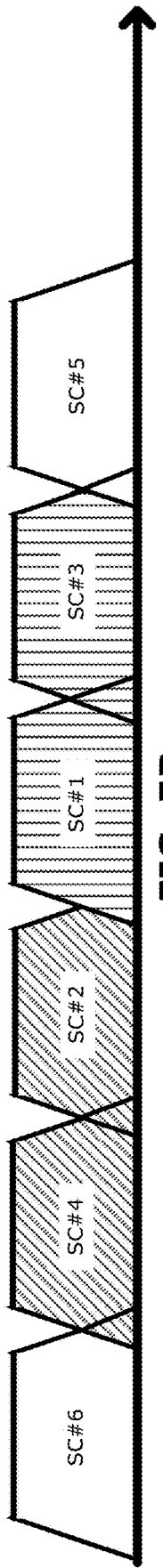
Figure 5C:
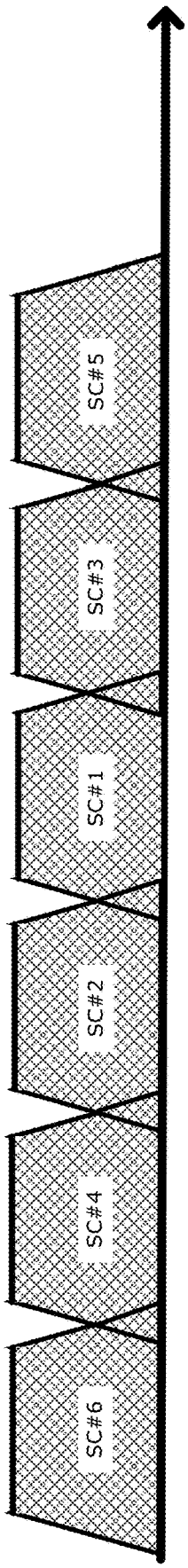

For example, FIGS. 5A-5C illustrate ICI cancellation scheduling for an even number of SCs (in this example, 6 SCs). Specifically, there are two edge SCs (indicated as SC #5 and SC #6), two second outermost SCs (which are adjacent to the respective edge SCs) (indicated as SC #3 and SC #4), and two third outermost SCs (which are adjacent to the second outermost SCs and the innermost SC) (indicated as SC #1 and SC #2). Notably, there is no single middle SC. FIGS. 5A-C illustrate ICI cancellation over a number of iterations.

Similarly to FIG. 4A, FIG. 5A illustrates that for a first number of iterations (from a first iteration up to a defined first threshold number of iterations), ICI cancellation is performed only for the second outermost SCs (in this example, SC #4 and SC #3) and only to cancel the ICI contribution from the adjacent edge SC. FIG. 5B illustrates that for a second immediately subsequent number of iterations (from the iteration immediately following the first threshold up to a defined second threshold number of iterations), ICI cancellation is performed for the second outermost SCs (in this example, SC #4 and SC #3) and also the third outermost SCs (in this example, SC #1 and SC #2), to cancel the ICI contribution from only one adjacent SC. Finally, FIG. 5C illustrates that for a third immediately subsequent number of iterations (from the iteration immediately following the second threshold up to a defined maximum number of iterations), ICI cancellation is performed for all SCs, to cancel the ICI contribution from all immediately adjacent SCs.

In the ICI cancellation scheduling described above, each stage of one-sided ICI cancellation is performed up to a defined threshold number of iterations. The threshold number of iterations for each successive stage of the one-sided ICI cancellation may be determined ahead of implementation. For example, the threshold number of iterations for each stage may be determined heuristically or according to an implementation constraint (e.g., maximum power consumption) or a performance constraint (e.g., a minimum average BER must be achieved). It may be noted that in the case where the threshold number of iterations is defined by a performance constraint, the number of iterations to be performed per stage may change dynamically. The above-described ICI cancellation scheduling schedules one-sided ICI cancellation for the second outermost SCs first, to remove the ICI contribution from the immediately adjacent edge SC first. The ICI contribution from the edge SC is expected to be the most reliable, because the edge SC experiences ICI only on one side of the SC. After one-sided ICI cancellation for the second outermost SCs, the ICI contribution from the second outermost SCs is considered to be suitably reliable to be used for one-sided ICI cancellation for the third outermost SCs, and so forth progressively inwards. In the final stage of the ICI cancellation, full ICI cancellation is performed to cancel the ICI contribution from immediately adjacent SCs on both sides.

The iterative PN estimation performed by the PN compensation module 250, using the iterative PN estimator 254, is now described. The iterative PN estimation may be performed using LMS-based iterative PN estimation (LIPNE), factor graph-based iterative PN estimation (FGIPNE), or any other suitable iterative PN estimation techniques. LIPNE may be simpler to implement compared to FGIPNE, however FGIPNE may achieve better performance. It should be understood that the present disclosure is not necessarily limited to LIPNE and FGIPNE implementations of the iterative PN estimator 254, and other techniques for iterative PN estimation are considered to be within the scope of this disclosure. For example, other iterative PN estimation techniques that make use of soft information from a FEC decoder to help improve PN estimation may be suitable. Variations of the example LIPNE or FGIPNE techniques described below are also considered to be within the scope of this disclosure.

Figure 6:
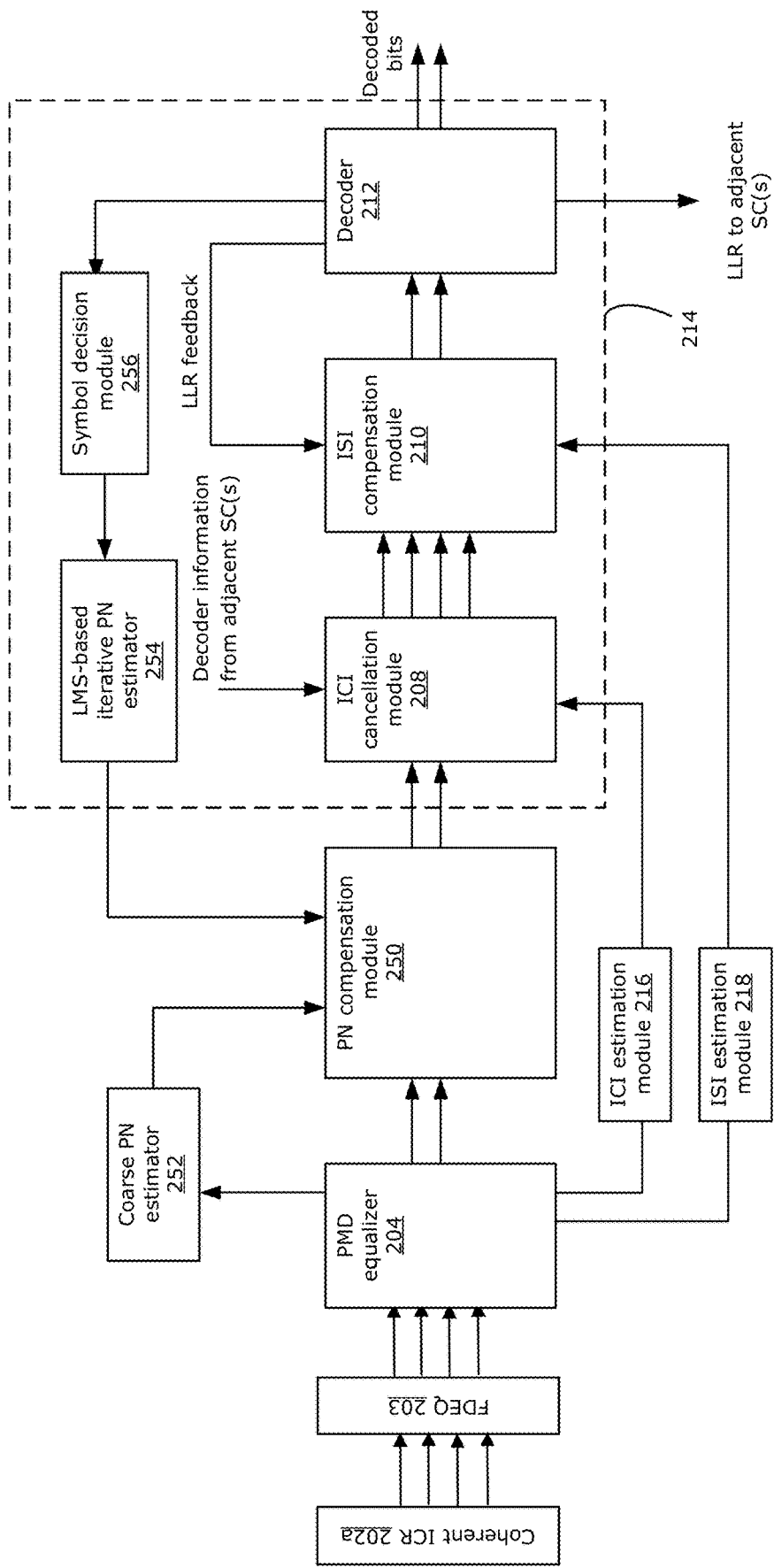
FIG. 6 is a block diagram illustrating the example receiver architecture of FIG. 2, implemented using a least mean square (LMS)-based iterative PN estimator.

With reference to FIG. 6, an example implementation using LIPNE is first described. In FIG. 6, details of the frontend components 202 are shown, specifically an integrated-coherent receiver (ICR) 202a that may include photodetectors (PD), transimpedance amplifiers (TIA) and quad-analog to digital converters (quad-ADC). It should be understood that other frontend components may be present, but are omitted for simplicity. The data paths shown in FIG. 6 have also been simplified to focus on the data paths relevant to PN compensation. In particular, the feedback data paths (shown as thicker arrows in FIG. 6) are active during the feedback (or iterative) stage of PN compensation. In this embodiment, the iterative PN estimator 254 is more specifically a LMS-based iterative PN estimator 254, and the feedback from the decoder 212 to the LMS-based iterative PN estimator 254 are symbol-based LLRS.

In this example, the LMS-based coarse PN estimations (calculated by the coarse PN estimator 252 as discussed above) are refined using the LLRS fed back from the decoder 212. A symbol decision module 256 receives bit-based LLRS from the decoder 212 and converts the bit-based LLRS into symbols, over each symbol duration, to provide to the LMS-based iterative PN estimator 254. The symbol decision module 256 first converts each bit-level LLR into a bit decision (e.g., if the bit LLR has a positive or zero value, the bit decision is "0"; and if the bit LLR has a negative value, the bit decision is "1"), and then maps the decided bits over a symbol duration to a symbol decision (e.g., according to a QAM constellation). To account for the ISI and ICI, the interference-induced effective pilot symbols are formulated by reconstructing the desired signals $\delta_{k,x/y}^{(m)}$ at every iteration (as described above), using the estimated interference channel and the hard-decisions of symbols from adjacent SC(s).

Using the LMS-based iterative PN estimator 254, the symbol decisions from the symbol decision module 256 are used to determine the error based on the estimated symbols and the coarse PN compensated symbols (that were stored in memory until completion of a prior iteration). The symbol error is then used to calculate a LMS PN estimate. The LMS-based iterative PN estimator 254 implements equations (6) followed by equation (13) in each iteration, where the symbol decision is used in place of the pilot symbol in the equations. The LMS PN estimate is subsequently used by the PN compensation module 250 to generate a cleaner demodulated symbol.

The example of FIG. 6, using a LIPNE approach, may be relatively simple to implement computationally. LIPNE may also require relatively low buffer space for storage of the symbol decisions in each iteration. The functionality of the LIPNE approach does not depend on the modulation format of the symbols, and explicit knowledge of the PN statistics is not required. However, there may be a tradeoff in performance, because LIPNE may suffer from possible error-propagation when symbol decisions are erroneous. Further, the LPINE approach for TFP systems may also incur performance degradation when LLW is relatively high.

Figure 7:
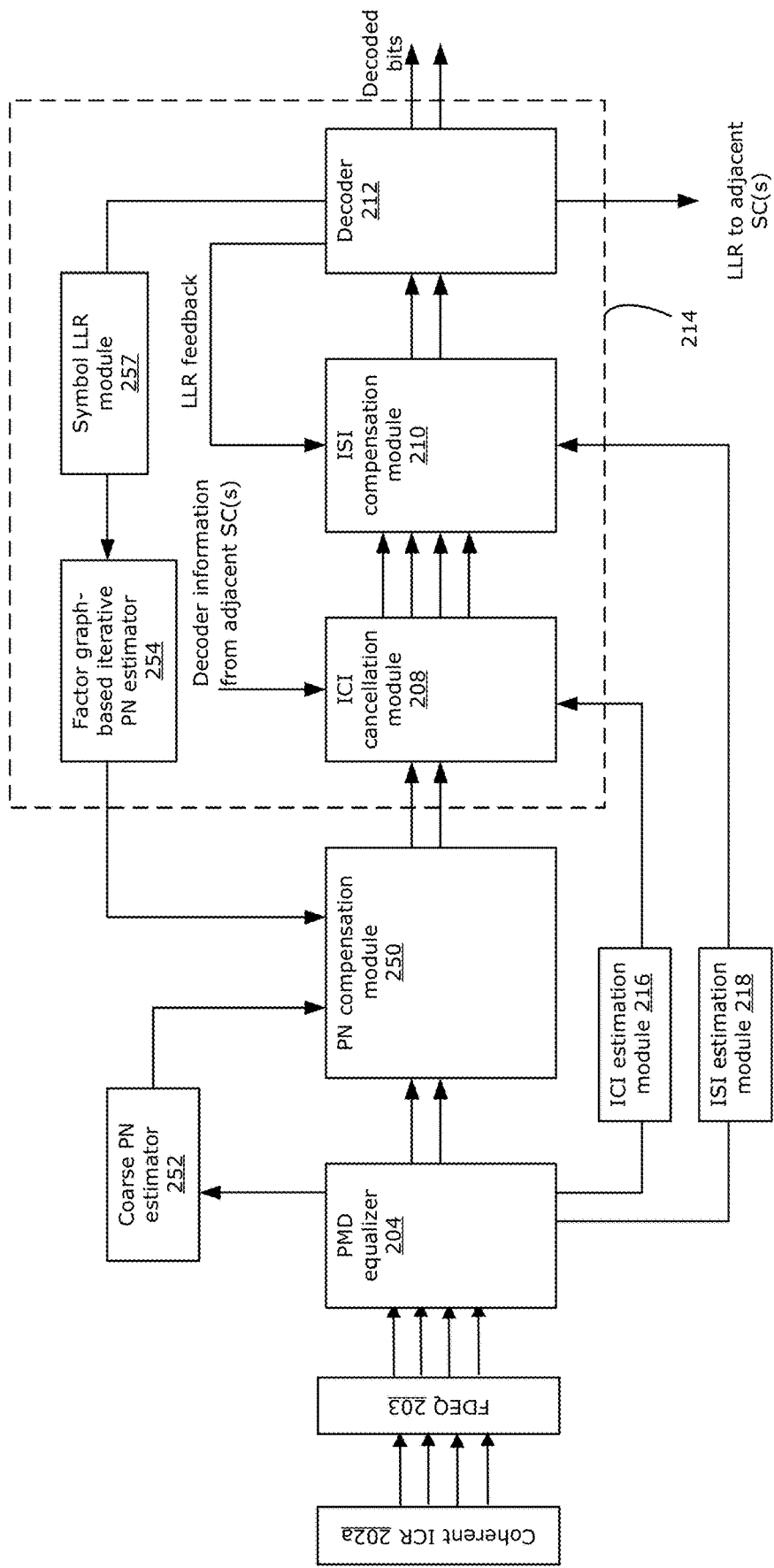
FIG. 7 is a block diagram illustrating the example receiver architecture of FIG. 2, implemented using a factor graph (FG)-based iterative PN estimator.

FIG. 7 is a block diagram illustrating an example implementation of iterative PN estimation using a factor-graph based approach. FIG. 7 is similar to FIG. 6, however the iterative PN estimator 254 is more specifically a factor graph-based iterative PN estimator 254 that makes use of bit-LLRs from the decoder 212. In the factor-graph based approach shown in FIG. 7, the bit-LLRs from the decoder 212 are converted to symbol-LLRs by a symbol LLR module 257. The symbol LLR module 257 calculates bit probabilities from the bit-LLRs, and uses the bit probabilities to calculate symbol probabilities (e.g., multiplying the corresponding bit probabilities, assuming independence among the bits in a symbol), which are used as input to the factor graph-based iterative PN estimator 254.

Compared to the LIPNE approach described with respect to FIG. 6, the FGIPNE approach of FIG. 7 may be able to make more effective use of LLR feedback from the decoder 212 by considering the probability distribution function (PDF) of the PN. In particular, the interference due to TFP is taken into account by augmenting the state-space based factor graph (FG). The factor graph-based iterative PN estimator 254 includes a memory (e.g., a buffer) to store LLRs from at least three iterations, to enable implementation of the FG.

Figure 8:
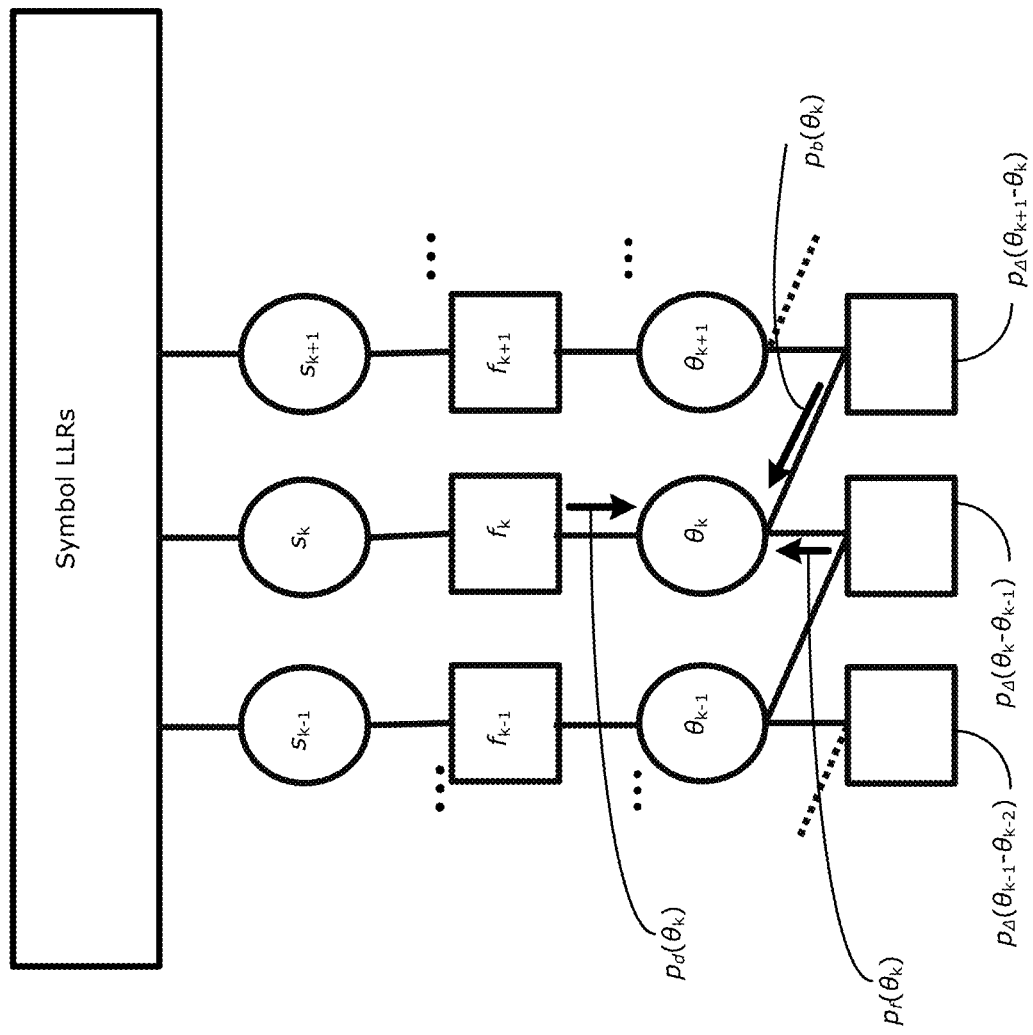
FIG. 8 illustrates an example FG that may be used for FG-based iterative PN estimation.

FIG. 8 illustrates an example FG, which may be implemented by the factor graph-based iterative PN estimator 254 calculating the PN from the bit LLRs produced by the soft-FEC decoder 212. Each circle in FIG. 8 denotes a variable node, and each square denotes a factor node. Messages are passed between these nodes for the refinement of the PN estimation and is indicated by thicker arrows, where $\theta_k$ is the PN for the kth iteration, $p_f$ is the forward matrix, $p_b$ is the backward matrix, $p_d$ is the conditional PDF of the received signal for a given $\theta$, and $p_{d\Delta}$ is the PDF of the PN increment between adjacent symbols (which may be modeled as Wiener phase noise). In each iteration, MAP estimates of the PN for both polarizations of all SCS in the superchannel are computed. To compute this, the product of all incoming messages to the $\theta_k$ variable node in the FG illustrated in FIG. 8 is evaluated. The forward metric $\alpha_k$ and backward metric $\beta_k$ are computed using Tikhonov parameterization and the variable $\gamma_k$ is defined as $\gamma_k = \beta_k - |\alpha_k|^2$. By including the effects of ISI and ICI, $\alpha_k$ and $\gamma_k$ for the $m^{th}$ SC and both polarizations may be calculated as:

$$[\alpha_{k,x}^{(m)}, \alpha_{k,y}^{(m)}]^T = \sum_{j=-L_s}^{L_s} h_{j,k}^{(m)} \odot \mathbb{E}(a_{k-j}^{(m)}) + \sum_{n \neq m} \sum_{v=-L_c}^{L_c} g_{v,k}^{(n,m)} \odot \mathbb{E}(\hat{a}_{k-v}^{(n)}) \quad (14)$$

$$[\gamma_{k,x}^{(m)}, \gamma_{k,y}^{(m)}]^T = \sum_{j=-L_s}^{L_s} \langle |h_{j,k}^{(m)}| \rangle^2 \odot \mathrm{Var}(a_{k-j}^{(m)}) + \sum_{n \neq m} \sum_{v=-L_c}^{L_c} \langle |g_{v,k}^{(n,m)}| \rangle^2 \odot \mathrm{Var}(\hat{a}_{k-v}^{(n)}) \quad (15)$$

where $\mathrm{Var}(\bullet)$ and $\langle |\bullet| \rangle^2$ denote element-wise variance and absolute-square operations, respectively. At each decoding iteration, the expectations and variances in the above equations are computed for the constellation symbols using the symbol-probabilities obtained from the LLRS fed back by the decoder 212. Finally, using the statistical property of the Tikhonov probability density function (PDF), the MAP estimate of the PN for the corresponding polarization and SC can be calculated as:

$$\hat{\theta}_{MAP} = \angle \left( \frac{2r_k \alpha_k^*}{\sigma^2 + \gamma_k} + a_{f,k} + a_{b,k} \right) \quad (16)$$

$$a_{f,k} = \frac{a_{f,k-1} + \frac{2r_{k-1}\alpha_{k-1}^*}{\sigma^2 + \gamma_{k-1}}}{1 + \sigma_\Delta^2 \left| a_{f,k-1} + \frac{2r_{k-1}\alpha_{k-1}^*}{\sigma^2 + \gamma_{k-1}} \right|} \quad (17)$$

$$a_{b,k} = \frac{a_{b,k+1} + \frac{2r_{k+1}\alpha_{k+1}^*}{\sigma^2 + \gamma_{k+1}}}{1 + \sigma_\Delta^2 \left| a_{b,k+1} + \frac{2r_{k+1}\alpha_{k+1}^*}{\sigma^2 + \gamma_{k+1}} \right|} \quad (18)$$

where, for each SC and polarization, $a_{f,k}$ and $a_{b,k}$ are computed recursively using message passing principles, $r_k$ is the noisy symbol before PN mitigation (i.e. the symbols obtained after coarse PN compensation in FIG. 6), $\sigma_\Delta^2$ is the aggregate variance of the transmitter and receiver laser PN, and $\sigma^2$ is the effective additive noise power of the noisy symbols.

While the FG approach involves more operational steps compared to the LIPNE, for example, the FG of FIG. 8 may be relatively simple to implement, because only one forward and one backward iteration is considered, thus requiring a relatively small amount of memory. The FG-based approach to iterative PN estimation may enable estimation of PN that takes into account PN from previous symbols. This may be useful because laser noise typically has a memory. The FG-IPNE approach described above with respect to FIGS. 7 and 8 may provide better performance and robustness to interference and laser PN. The FGIPNE approach may also be less prone to error propagation in HOM formats. FGIPNE metrics computation requires an estimate of statistics of the transmitter and receiver laser PN (to be used as $\sigma_\Delta^2$ in equations (17) and (18)).

Figure 9:
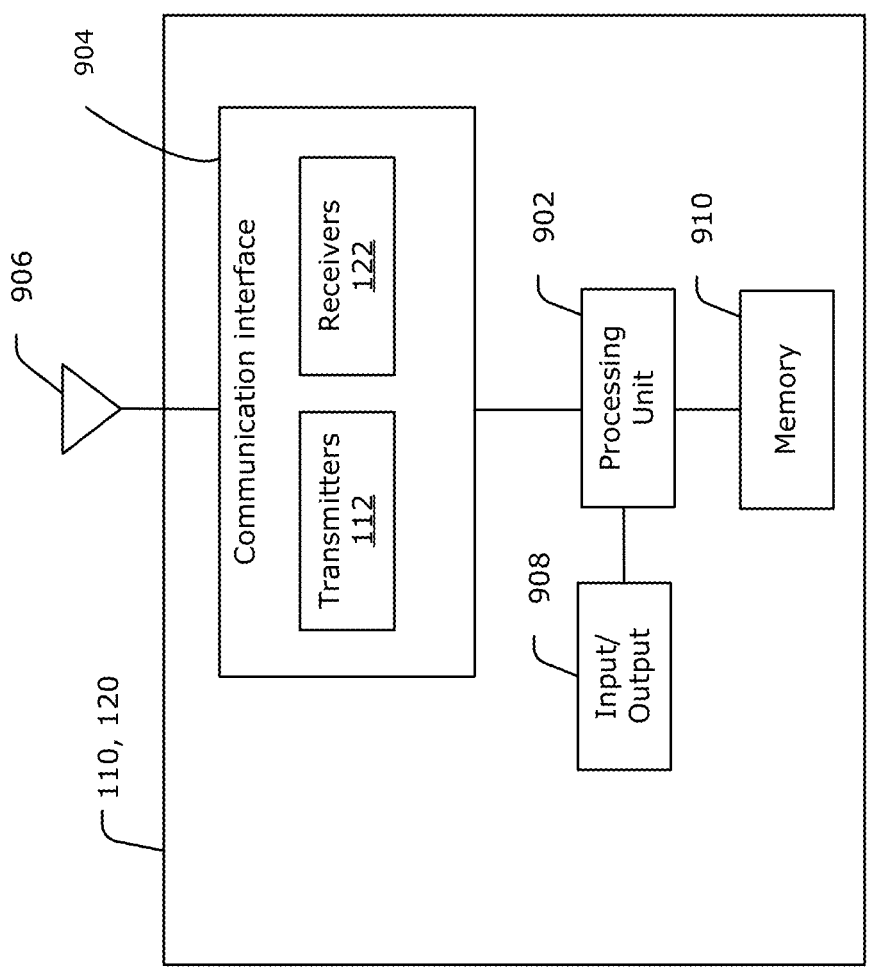
FIG. 9 is a block diagram of an example apparatus that may be used to implement examples described herein.

FIG. 9 is a block diagram illustrating an example apparatus that may implement the examples described herein. For example, FIG. 9 may represent a UE or BS that may be a source node 110 or a destination node 120 as shown in FIG. 1. In particular, FIG. 9 may represent an apparatus that includes the receiver architecture as described above.

As shown in FIG. 9, the apparatus includes at least one processing unit 902. The processing unit 902 implements various processing operations of the apparatus. For example, the processing unit 902 may perform signal coding, data processing, power control, input/output processing, or any other functionality of the apparatus. The processing unit 902 includes any suitable processing or computing device configured to perform one or more operations. The processing unit 902 could, for example, include a microprocessor, microcontroller, digital signal processor, field programmable gate array, or application specific integrated circuit.

The apparatus also includes at least one communication interface 904 for wired and/or wireless communications. The communication interface 904 includes any suitable structure for generating signals for wireless or wired transmission and/or processing signals received wirelessly or by wire. In particular, the communication interface 904, as shown, includes a plurality of transmitters 112 and a plurality of receivers 122. Each receiver 122 may implement a receiver architecture as described herein. Although shown as a single functional unit, the communication interface 904 may instead be implemented using at least one transmitter interface containing the transmitters 122 and at least one separate receiver interface containing the receivers 122.

The apparatus in this example includes at least one antenna 906 (in other examples, such as where the apparatus is used only for wired communications, the antenna 906 may be omitted). Each antenna 906 includes any suitable structure for transmitting and/or receiving wireless or wired signals. One or multiple antennas 906 could be used in the apparatus. In some examples, one or more antennas 906 may be an antenna array, which may be used to perform beam-forming and beam steering operations.

The apparatus further includes one or more input/output devices 908 or input/output interface. The input/output device(s) 908 permit interaction with a user or other devices in the network (e.g., for receiving optical signals). Each input/output device 908 includes any suitable structure for providing information to or receiving information from a user, such as a speaker, microphone, keypad, keyboard, display, or touchscreen, including network interface communications.

In addition, the apparatus includes at least one memory 910. The memory 910 stores instructions and data used, generated, or collected by the apparatus. For example, the memory 910 could store software instructions or modules configured to implement some or all of the functionality and/or embodiments described herein and that are executed by the processing unit(s) 902. The memory 910 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Compared to other existing solutions for PN mitigation in TFP systems, the PN compensation disclosed herein provides better ROSNR and distance improvement. This may help to enable beyond-Tbps data rates per superchannel. In simulations, examples of the disclosed PN compensation systems have been found to exhibit good tolerance to PN and TFP ISI and ICI. The disclosed systems may provide robustness against laser drifts and additional bandwidth limitation in the form of cascades of ROADM nodes that may be present in the fiber link.

Figure 10:
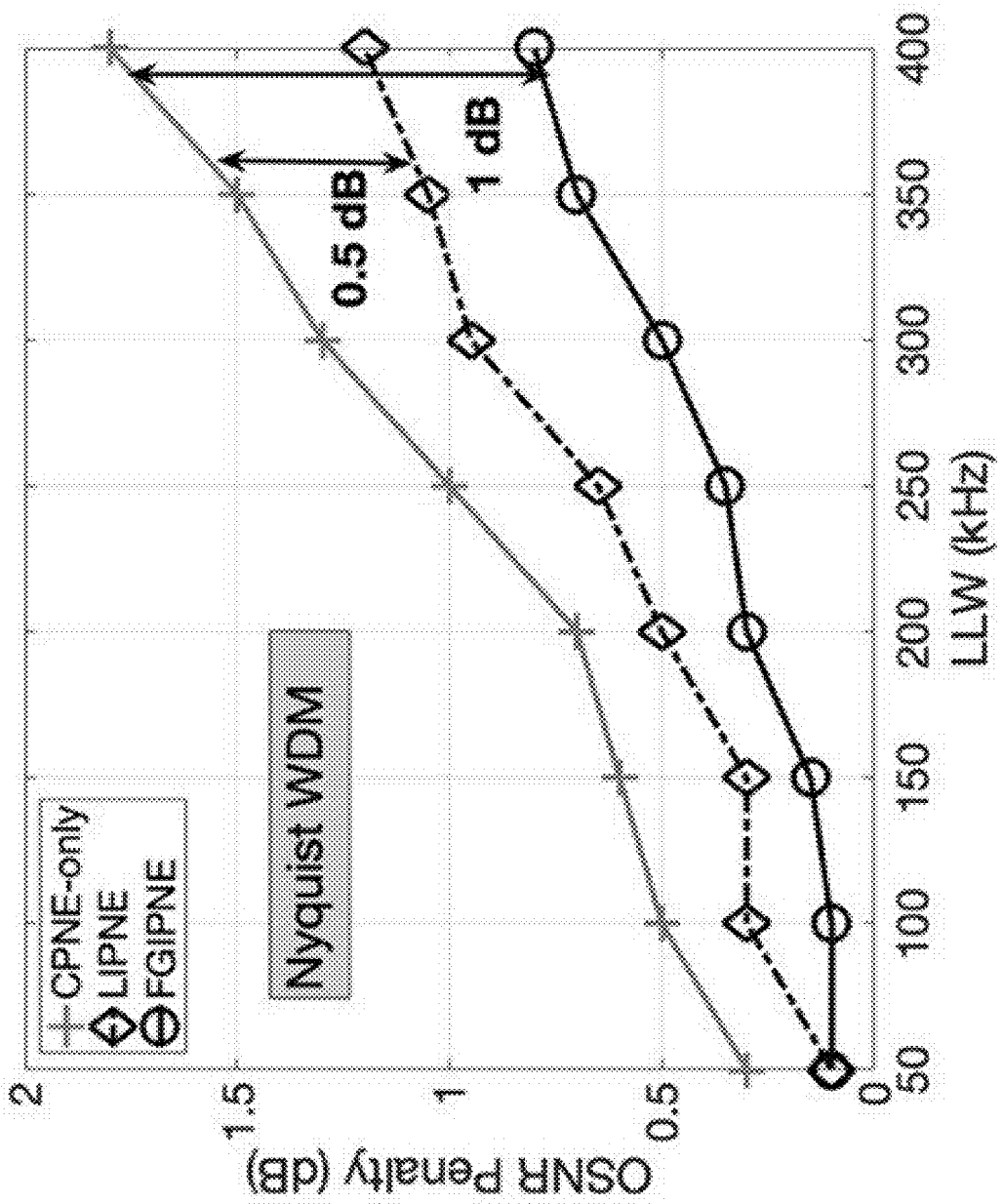
FIGS. 10-11 show simulation results for an example implementation of the receiver architectures of FIGS. 6 and 7, compared to prior art approaches.
Figure 11:
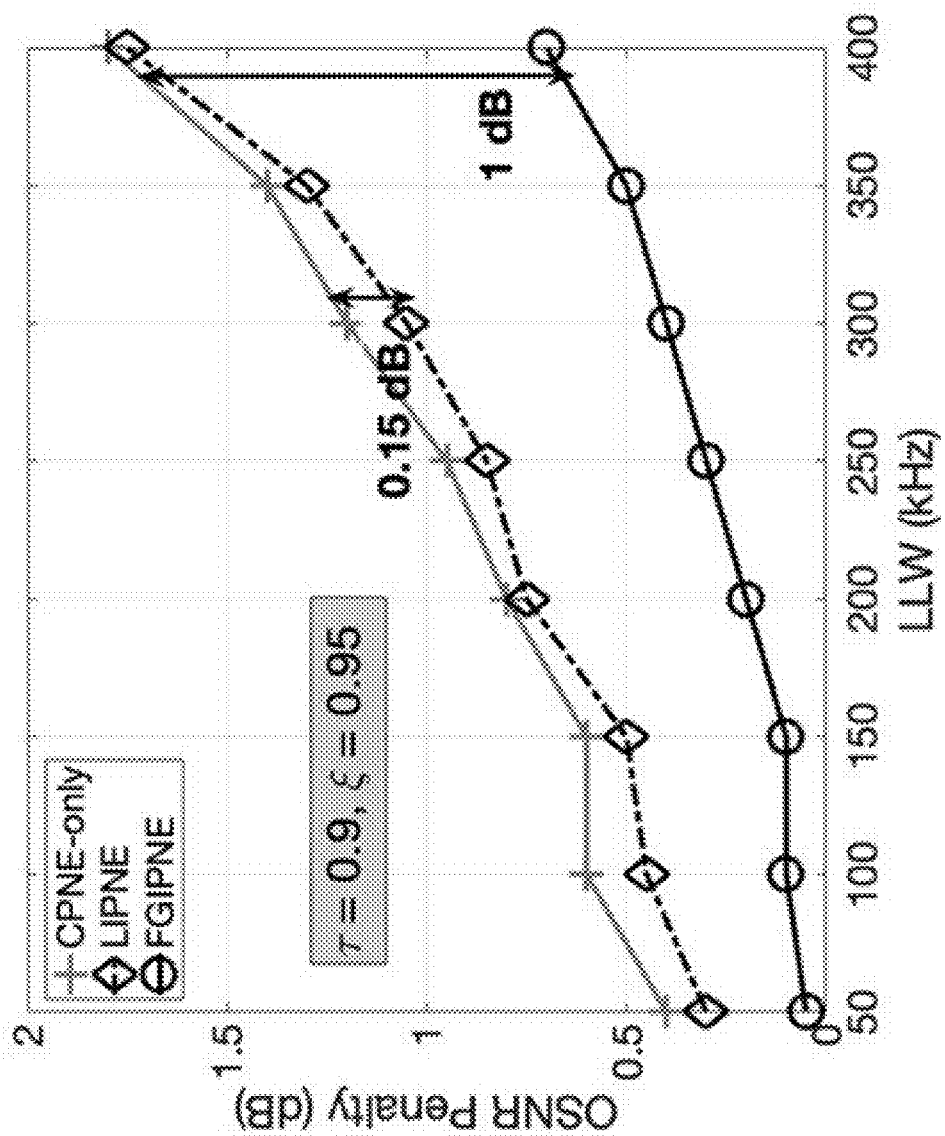

FIGS. 10 and 11 show results from example simulations. In the simulations, the following parameters were used: baud rate of 62.5 Gbaud; root raised cosine pulse shape having roll-off factor $\alpha$ of 0.2; FEC overhead of 20%; chromatic dispersion of 20,000 ps/nm; state of polarization rotation of 2.5 kHz; laser linewidth of 75 kHz; superchannel wavelength selected switch (WSS) bandwidth of 187.5 GHz (i.e., 62.5 GHz×3); 9 taps for ICI estimation; 5 taps for ISI estimation; and a maximum of 5 equalization iterations. FIG. 10 illustrates the required OSNR (ROSNR) penalty vs. laser linewidth (LLW) for Nyquist transmissions (where $\alpha$=0.1), and FIG. 11 illustrates the ROSNR penalty vs. laser linewidth for TFP transmissions (where $\tau$=0.9, and $\xi$=0.95). In both FIG. 10 and FIG. 11, the signal carries 16 QAM modulated symbols with a net throughput of 400 Gbps.

FIGS. 10 and 11 compare the LIPNE and FGIPNE approaches described above with a prior art coarse feedforward only PNE approach. The prior art coarse PNE approach (even after optimization of the LMS step size per laser linewidth) exhibits up to 1 dB higher ROSNR penalty than the disclosed FGIPNE approach, for both Nyquist transmission and TFP transmission. The FGIPNE approach shows the best performance for both Nyquist transmission and TFP transmission, with a maximum degradation of 0.5 dB with increasing LLW (up to a LLW of 400 kHz as simulated) compared to more than 1.6 dB for the prior art approach. The LIPNE approach also shows better performance than the prior art coarse PNE approach. As shown in FIG. 10, the LIPNE approach shows an improvement of up to 0.5 dB lower ROSNR penalty compared to the prior art approach for Nyquist transmission, and an improvement of about 0.15 dB lower ROSNR penalty compared to the prior art approach for TFP transmission.

In various examples, the present disclosure has described a receiver architecture that enables PN compensation in a coherent optical superchannel system, even in the presence of ICI and ISI (e.g., due to interference from filtering and adjacent channels or due to a transmit waveform that incorporates time-domain and frequency domain compression for higher spectral efficiency). PN compensation makes use of both feedforward and feedback processing. In particular, feedback processing uses information from an FEC decoder (e.g., LLRS from a soft-FEC decoder) is used to improve the PN estimation, enabling more accurate PN compensation and reduce any performance penalty. In some examples, iterative PN estimation is performed using a stochastic gradient (also known as LMS)-based approach. In some examples, iterative PN estimation is performed using a factor graph parameterized approach.

Although examples have been described in the context of coherent optical transmission, the present disclosure may also be applicable for other high performance communication systems where phase noise is a concern in addition to ISI and ICI from the channel.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A receiver for an optical signal over a first subchannel, the receiver comprising:
   a coarse phase noise (PN) estimator coupled to receive a signal from an equalizer of the receiver, and to provide a coarse PN estimation based on pilot symbols in the signal;
   a PN compensation module coupled to receive a signal from the equalizer and a coarse PN estimation from the coarse PN estimator, and to provide a PN-compensated signal;
   an inter-channel interference (ICI) cancellation module coupled to receive the PN-compensated signal from the phase noise compensation module, and to provide a ICI-cancelled signal;
   an inter-symbol interference (ISI) compensation module coupled to receive the ICI-cancelled signal from the ICI cancellation module, and to provide a ISI-compensated signal;
   a forward error correction (FEC) decoder coupled to receive the ISI-compensated signal from the ISI compensation module, and to perform iterative decoding to provide decoded bits; and
   an iterative PN estimator coupled to receive, from the FEC decoder, log likelihood ratio (LLR) from a decoding iteration, and to provide an iterative PN estimation to the PN compensation module;
   the PN compensation module being further coupled to receive the iterative PN estimation from the iterative PN estimator;
   the FEC decoder being further coupled to provide LLR from a decoding iteration to the ISI compensation module and to at least a second receiver for a second subchannel that is immediately adjacent in frequency to the first subchannel;
   the ICI cancellation module being further coupled to receive decoder output from at least the second receiver, the ICI cancellation module using the decoder output from at least the second receiver to provide the ICI-cancelled signal.

2. The receiver of claim 1, wherein the iterative PN estimator is a least means square (LMS)-based iterative PN estimator that provides the iterative PN estimation based on a LMS calculation of symbol error.

3. The receiver of claim 2, wherein the iterative PN estimator is configured to:
store LLRS from a plurality of decoding iterations over a symbol duration;
convert the stored LLRS over the symbol duration to symbol LLR for a symbol, to determine a decoded symbol; and
calculate the LMS of the decoded symbol compared to a known symbol constellation.

4. The receiver of claim 1, wherein the iterative PN estimator is a factor graph-based iterative PN estimator that provides the iterative PN estimation based on a factor graph-based calculation of symbol error.

5. The receiver of claim 4, wherein the iterative PN estimator is configured to:
store LLRS from three decoding iterations; and
calculate a maximum a posteriori probability (MAP) estimate of the PN in a current iteration, based on message passing from a previous iteration and a next iteration.

6. The receiver of claim 1, wherein the ICI cancellation module performs ICI cancellation using iterative ICI cancellation.

7. The receiver of claim 1, wherein the ICI cancellation module performs ICI cancellation using stored known interference channel characteristics, and wherein the ISI compensation module performs ISI compensation using the stored known interference channel characteristics.

8. The receiver of claim 1, wherein the ISI compensation module performs ISI compensation using maximum a posteriori probability (MAP) equalization.

9. The receiver of claim 8, wherein the ISI compensation module converts the LLR from the decoding iteration to a symbol LLR and uses the symbol LLR together with the ISI estimation to provide the ISI-compensated signal.

10. The receiver of claim 1, wherein the ISI compensation module performs ISI compensation using a linear ISI equalization module using a minimum mean squared error (MMSE) or decision feedback equalization (DFE) criteria.

11. The receiver of claim 1, wherein the ISI compensation module performs ISI compensation using a frequency domain block equalizer processing N blocks of symbols together and using a zero forcing (ZF) equalizer in the frequency domain.

12. An apparatus for receiving optical signals over a superchannel formed by a plurality of subchannels, the apparatus comprising:
a plurality of receivers, each receiver receiving a respective optical signal over a respective subchannel of the superchannel, each receiver being the receiver of claim 1.

13. The apparatus of claim 12, wherein the plurality of receivers is controlled to perform ICI cancellation according to a defined ICI cancellation schedule, and wherein the ICI cancellation schedule defines at least two stages, and wherein in a first stage ICI cancellation is performed only by a first subset of receivers for a first number of iterations.

14. The apparatus of claim 13, wherein the first subset of receivers includes only receivers corresponding to respective subchannels having two immediately adjacent subchannels in the superchannel.

15. The apparatus of claim 14, wherein ICI cancellation is performed by each receiver in the first subset to cancel ICI contribution from only one immediately adjacent subchannel during the first stage.

16. The apparatus of claim 12, wherein the iterative PN estimator in each receiver is a least means square (LMS)-based iterative PN estimator that provides the iterative PN estimation based on a LMS calculation of symbol error.

17. The apparatus of claim 12, wherein the iterative PN estimator in each receiver is a factor graph-based iterative PN estimator that provides the iterative PN estimation based on a factor graph-based calculation of symbol error.

18. The apparatus of claim 12, wherein the ICI cancellation module in each receiver performs ICI cancellation using iterative ICI cancellation.

19. The apparatus of claim 12, wherein the ISI compensation module in each receiver performs ISI compensation using maximum a posteriori probability (MAP) equalization.

20. The apparatus of claim 12, wherein the ICI cancellation module in each receiver performs ICI cancellation using stored known interference channel characteristics, and wherein the ISI compensation module in each receiver performs ISI compensation using the stored known interference channel characteristics.

* * * * *